INVENTORS:
EDWIN RAY MILLS and
TONY RUFUS RAY

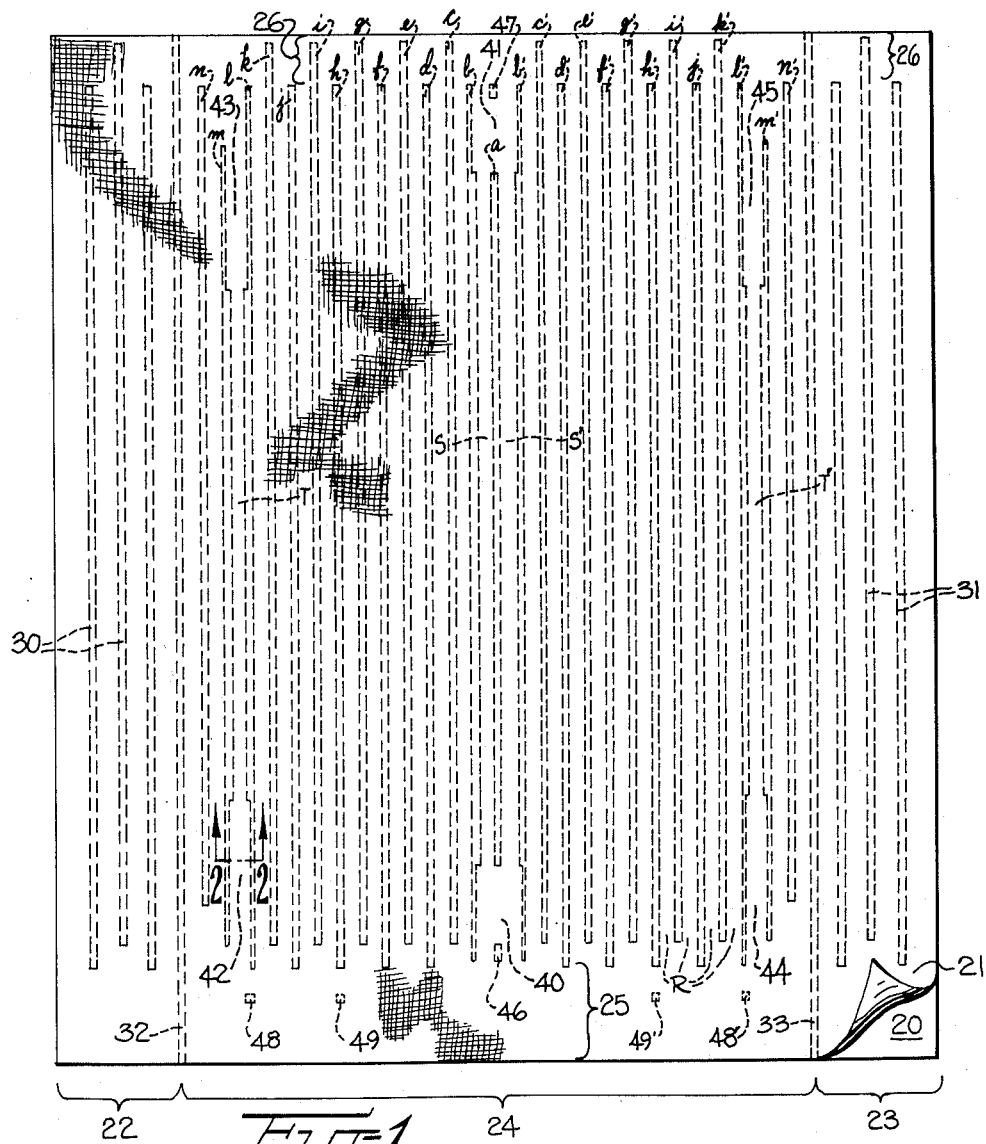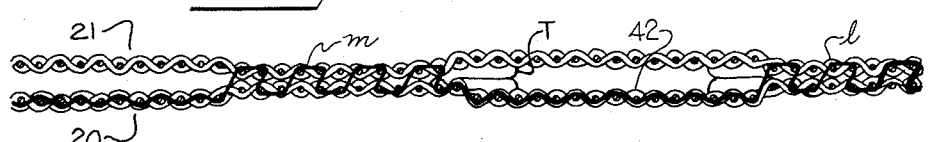

BY Easton, Bell, Hunt & Dilger
ATTORNEYS

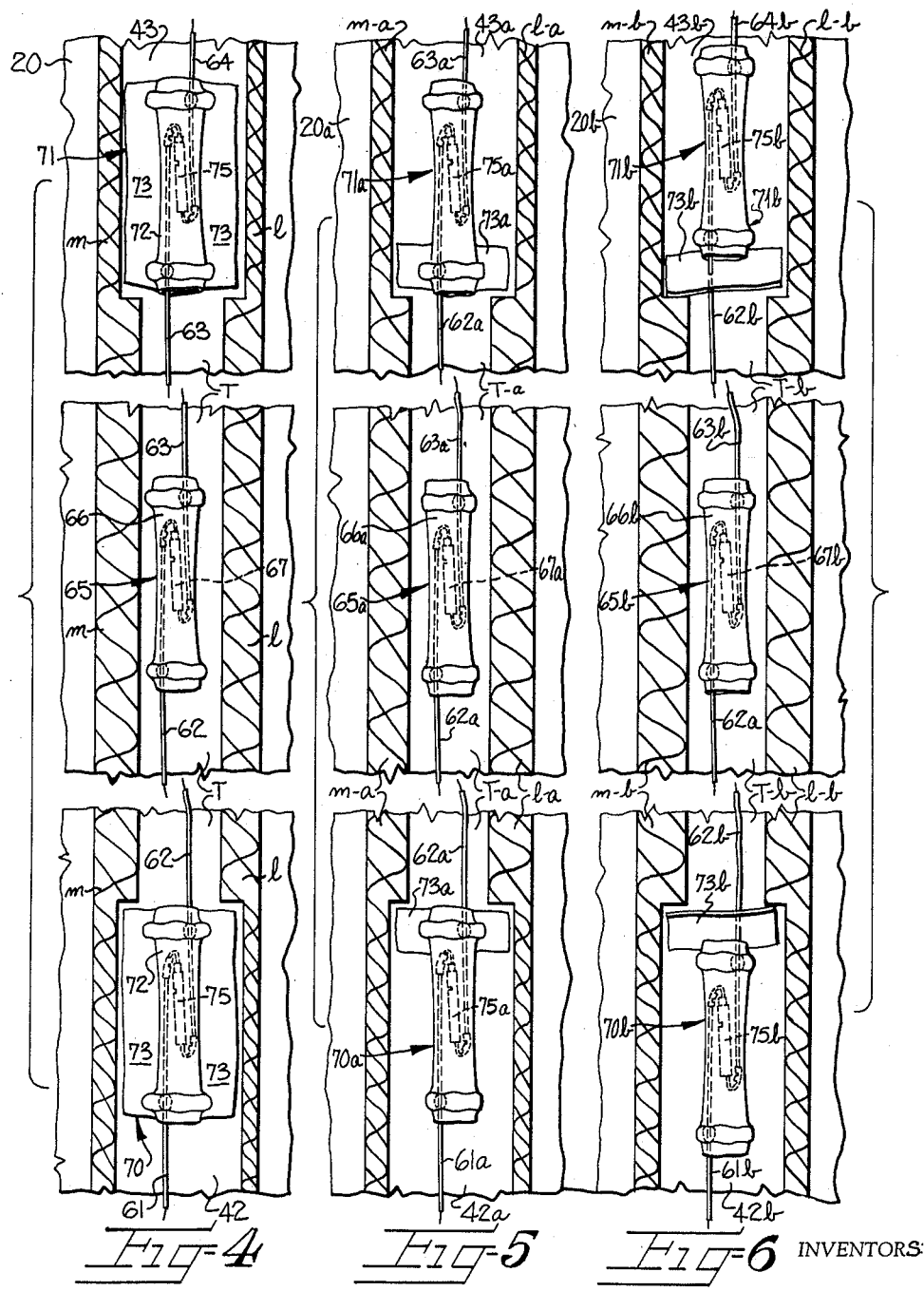

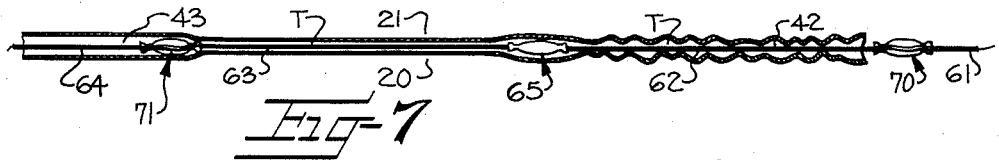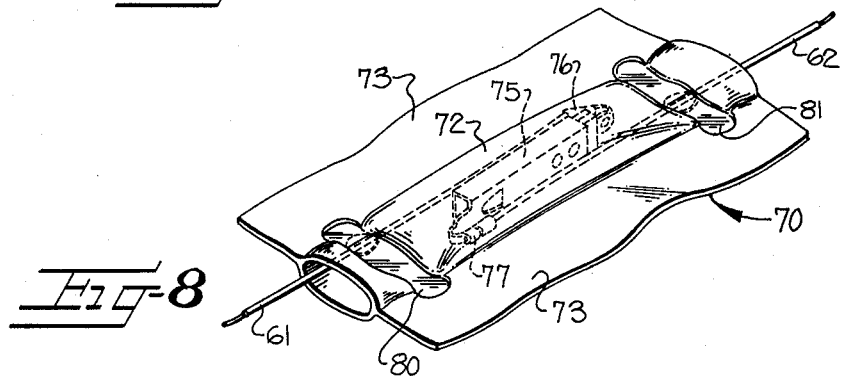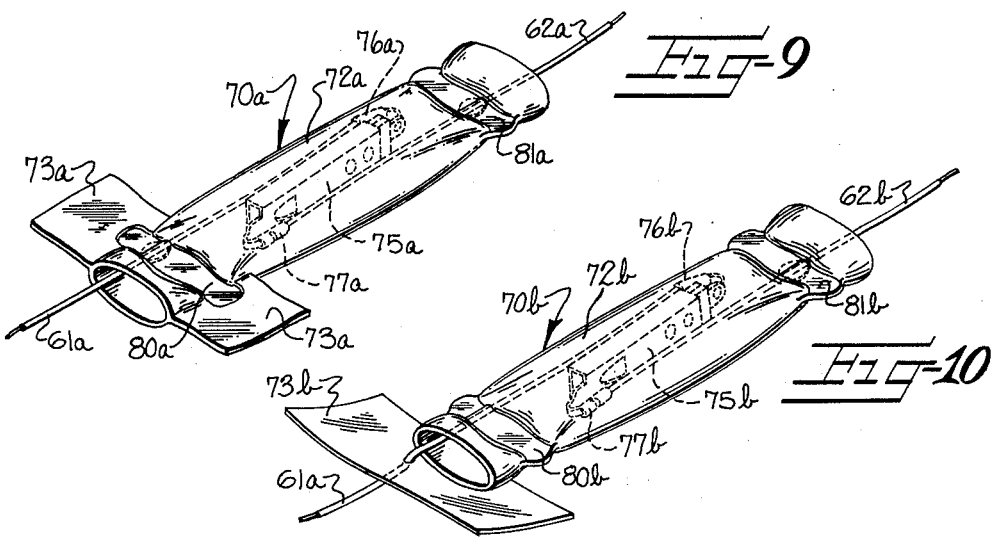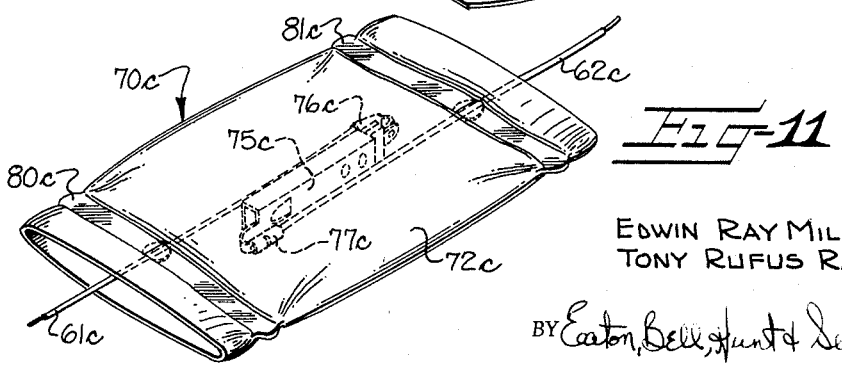

United States Patent Office 3,119,926
Patented Jan. 28, 1964

3,119,926
ELECTRICALLY HEATED ARTICLE WITH
THERMOSTAT RETAINER MEANS
Edwin Ray Mills and Tony Rufus Ray, Smithfield, N.C.,
assignors to Fieldcrest Mills, Inc., Spray, N.C., a corporation of Delaware
Filed Sept. 16, 1960, Ser. No. 56,433
5 Claims. (Cl. 219—46)

This invention relates to electrically heated pliable articles such as fabrics, pads and other analogous articles in which electrical resistance wire is incorporated to be used for warming or heating. More especially, this invention relates to an improved electrically heated blanket whose electrical resistance wires are connected to several spaced thermostats for breaking the electrical circuit to the heating coil upon the respective areas of the blankets becoming overheated to a predetermined extent.

For several years, electrically heated blankets, pads and analogous articles were constructed of two or more plies or layers of fabric, with zig-zag heating coils of resistance wire positioned between the plies. The temperature of such blankets was controlled by external thermo-electric devices, and no thermostats were interposed in the coils per se. Thus, the distribution of heat through the blanket could not be predetermined and hot spots would frequently occur at various places in the blanket, especially at places where the blanket might be folded or severely wrinkled. Such hot spots were, of course, a fire hazard.

More recently, pre-adjusted thermostats, usually positioned in sealed plastic packages, have been provided which were interposed in each heating coil at various locations so that, upon certain areas of the blanket becoming overheated to a predetermined extent, the respective thermostats would open and stop the flow of current through the heating coil until the respective areas of the blanket cooled to a safe temperature.

With the advent of spaced thermostats in electrically heated blankets, it was discovered that the thermostats would become displaced during use of the blanket, particularly during laundering. This would reduce the efficiency of heat distribution and would cause a recurrence of the problem of hot spots mentioned above. Many electrically heated blankets have been returned to the manufacturer because the thermostats have shifted away from their original intended location.

Many attempts have been made to provide thermostat retaining means for preventing unintentional displacement of the thermostat packages in electric blankets. Such thermostat retaining means have involved the use of adhesives or stitching for forming individual pockets between the layers of fabric and completely surrounding each thermostat. There are many drawbacks in this prior type of construction in that formation of such pockets had to be effected after the heating coils and thermostats were installed between the layers of the fabric, the formation of such pockets has been time-consuming, tedious and expensive, and it has been extremely difficult to replace any thermostats or resistance wires which may have become defective through misuse or which would not meet certain required safety standards during final manufacturing tests.

It is therefore an object of this invention to provide an improved two-ply electrically heated pliable article and method of making the same wherein the article is formed with elongate substantially parallel ducts or channels of substantially uniform width between the plies thereof, one or more of the ducts being special ducts which are expanded or enlarged at either or both ends thereof to form open-ended pockets thereat. A flanged or enlarged thermostat package interposed in a heating conductor or resistance wire fits in each pocket and the conductor is threaded through the respective special duct as well as being threaded through others of the ducts.

Preferably, a flanged or relatively large thermostat package is provided in an enlarged pocket at each end of the special ducts, with a conductor extending through the body of the duct defined between the respective pockets and having a relatively smaller or non-flanged package interposed in a medial portion of the conductor in the special duct. The relatively large packages are adapted to engage shoulders formed at the junctures of the pockets and the respective special ducts so the enlarged thermostat packages are prevented from substantial movement in either direction longitudinally of the special ducts. Since the smaller thermostat package is interposed in the conductor extending between those thermostat packages which are retained in the pockets, the relatively smaller package is also retained in predetermined position, even though the article may be severely wrinkled.

It is another object of this invention to provide a blanket or the like having a plurality of elongate, substantially parallel ducts therein, wherein all of the ducts are of substantially the same width, at least one of the ducts being a special duct having a body provided with an enlarged coextensive pocket at at least one end thereof adapted for receiving a relatively wide thermostat assembly therein, and the body being of a length at least one-fourth as long as the blanket when measured parallel to the duct body.

It is another object of this invention to provide a blanket structure of the character described wherein substantially parallel ducts are formed by interweaving two plies of fabric at spaced intervals of predetermined extent, and either or both opposed ends of at least one of the ducts are expanded to form pockets thereat, thus defining a relatively narrower duct body therebetween, the pockets being formed by interweaving the two plies of fabric at spaced intervals of varying extent with respect to the intervals at which the plies are interwoven in forming the ducts, so that the pockets are of greater width than the width of the ducts.

Some of the objects of the invention having been stated, other objects will appear as the description proceeds when taken in connection with the accompanying drawings, in which—

FIGURE 1 is a plan view of an improved blanket with a preferred arrangement of the channels and pockets formed therein, and omitting the heating coils and thermostats;

FIGURE 2 is an enlarged fragmentary sectional view taken substantially along line 2—2 in FIGURE 1;

FIGURE 4 is an enlarged fragmentary view of a portion of one of the channels shown in FIGURE 1 and portions of the corresponding pockets, with parts broken away, and showing one form of the flanged or enlarged thermostat assemblies in the corresponding pockets;

FIGURE 5 is a view similar to FIGURE 4 showing a second form of flanged thermostat assembly in each pocket;

FIGURE 6 is another view similar to FIGURE 4, showing a third form of flanged thermostat assembly in each pocket, wherein the flange is an element separate from the respective thermostat package;

FIGURE 7 is a somewhat schematic sectional view taken longitudinally of one of the channels and respective pockets showing how the blanket plies may be wrinkled to facilitate attaching a conductor to one of the enlarged thermostats and then inserting the enlarged thermostat in the pocket;

FIGURES 8, 9 and 10 are isometric views of the three forms of flanged thermostat assemblies shown in respective FIGURES 4, 5 and 6;

FIGURE 11 is an isometric view of a fourth form of enlarged thermostat package or assembly which may be substituted for any of the enlarged or flanged thermostat assemblies shown in FIGURES 4, 5, 6, 8, 9 and 10.

Figure 3:
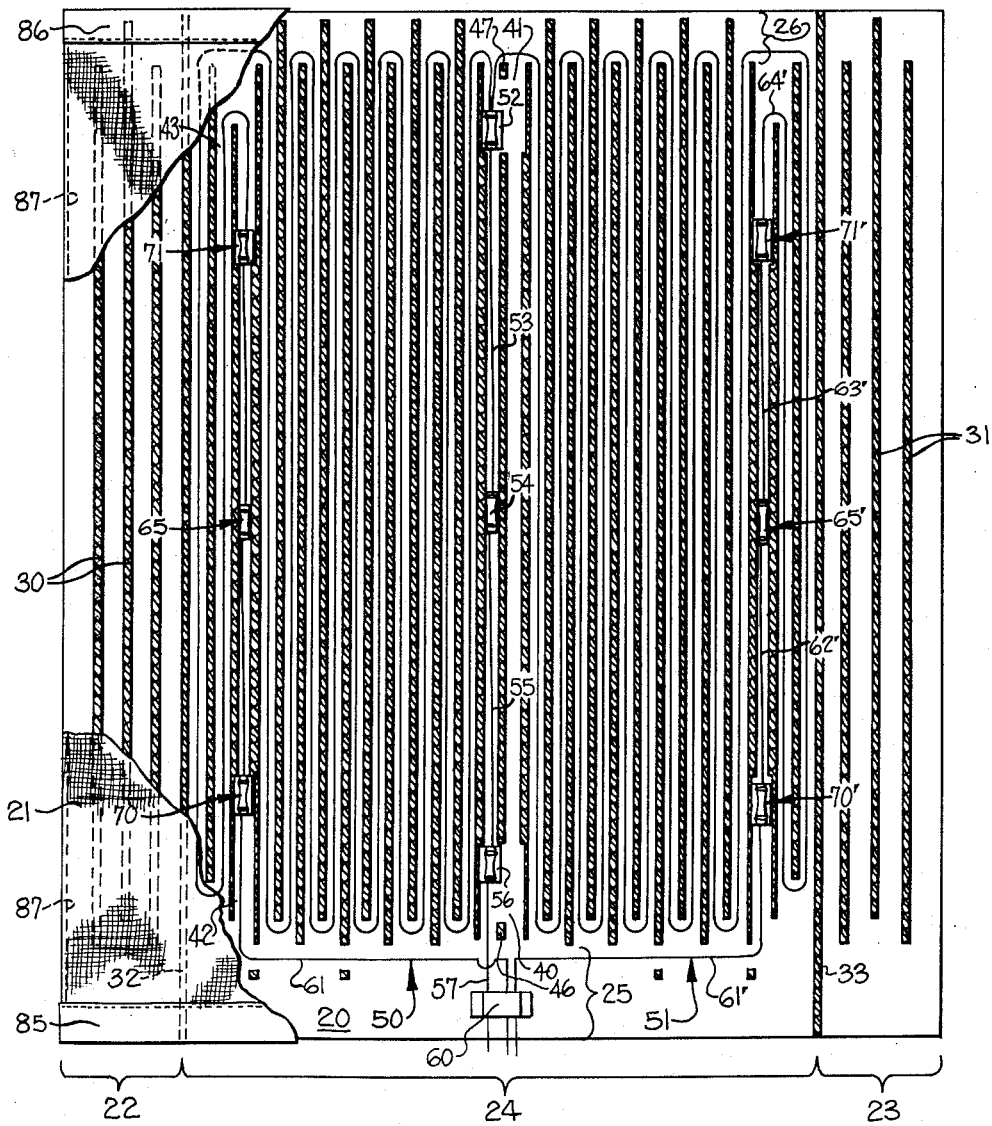
FIGURE 3 is a top plan view of the blanket, similar to FIGURE 1, but showing the top ply broken away to better illustrate the channels and pockets, showing a preferred arrangement of heating coils and thermostat assemblies therein, and also showing a binder attached to opposed ends of the blanket.

Referring more specifically to the drawings, and more particularly to FIGURES 1, 2 and 3, the illustrated article comprises a woven double-blanket fabric in the form of two plies 20, 21. The two plies 20, 21 may be separate except for being interwoven at certain points in accordance with the invention, and they may be of the same or different weights, weaves or constructions. The term "blanket" is used herein to represent any type of web material for use as a blanket, rug, heating pad or other analogous article.

The blanket shown in FIGURES 1 and 3 includes opposed longitudinally extending side marginal areas 22, 23 and an intervening main body area 24. The opposite ends of the blanket include a foot area 25 and a head area 26, the latter areas extending throughout the width of the blanket and embracing corresponding portions of the side margins 22, 23 and body 24.

If so desired, the two plies 20, 21 may be interwoven along their opposite side margins 22, 23 into a solid two-ply fabric. However, in this instance, the two plies are interwoven along spaced longitudinal lines 30, 31 which may extend throughout the length of the side margins 22, 23, but are shown terminating on a lateral plane substantially coinciding with the juncture of the body 24 and the foot area 25. The margins 22, 23 are defined by respective interwoven lines or partitions 32, 33 which extend substantially throughout the length of the blanket and also define opposed longitudinal side edges of the body 24.

In weaving the body 24 of the blanket, the two plies are also interwoven at spaced intervals, thus forming interwoven lines or partitions extending longitudinally of the blanket. Since some of these partitions differ from others, the centermost of these partitions is indicated at $a$, those partitions between partition $a$ and line 32 are indicated at $b$ through $n$, and those partitions between partition $a$ and interwoven line 33 are indicated at $b'$ through $n'$. The partitions $a$—$n$ and $b'$—$n'$ are generally equally spaced throughout the width of the body 24 and, with the exception of those places at which pockets are formed, as will be later described, the partitions may be of substantially the same width in each instance.

Preferably, the partitions $c, e, g, i, k$ and $c', e', g', i', k'$ extend from a point closely adjacent the uppermost end of the blanket to a point spaced from the juncture of the foot area 25 with the body 24. Intervening partitions $b, d, f, h, j, l, n$ and $b', d', f', h', j', l'$ start at a point spaced from the upper end of the blanket and define the juncture between the body 24 and the head area 26. The other ends of the latter partitions terminate outwardly of the aforementioned partitions $c, e, g, i, k$ and $c', e', g', i', k'$ and define the juncture of the foot area 25 with the body 24. Thus, the ends of adjacent partitions are disposed in staggered relationship, as is desirable in order to accommodate the resistance wires or conductors of the heating coils to be later described.

Although it is not entirely necessary, it will be noted that opposed ends of partitions $m$ and $m'$ terminate short of, and are thus spaced inwardly from, opposed ends of the adjacent partitions $l, l'$ and $h, h'$. Certain adjacent pairs of the partitions heretofore described within the body 24 define what may be termed as regular channels or ducts therebetween; that is, each of the channels R is of the same width throughout its length. In this instance, regular channels R are defined between the partitions $b$ through $l$, $b'$ through $l'$ and regular open-ended channels or ducts are also formed on opposite sides of each partition $n, n'$. However, special expanded-end channels or ducts S, S′ are formed between partition $a$ and medial portions of partitions $b, b'$ straddled thereby, and special expanded-end channels or ducts T, T′ are formed between medial portions of respective pairs of partitions $l, m$ and $l', m'$.

Opposed end portions of partitions $b, b', l, m,$ and $l', m'$ are relatively thin as compared to the major portions thereof to thus form channel enlargements or pockets 40–45 at opposite ends of the channels S, S′, T, T′. Pockets 40, 41 complement both of the centrally located special channels S, S′ so that each of the channels S, S′ includes a restricted or relatively narrow body defined between the pockets 40, 41. The pockets 42, 43 define opposite ends of the restricted or relatively narrow body of special channel T, and the pockets 44, 45 define opposite ends of the restricted or relatively narrow body of special channel T′. Thus, the pockets also form shoulders at the corresponding ends of the bodies of respective special channels S, S′, T, T′.

Although the bodies of special channels S, S′, T, T′ are restricted with respect to the pockets 40–45, they should be of substantially the same width as the regular channels R. The bodies of the special channels should also be of substantially greater length than the length of the individual pockets 40–45 formed at opposite ends thereof, or of a length at least equal to one-fourth the length of the blanket when viewed longitudinally of the channels.

The two plies 20, 21 of the blanket are interwoven at small areas 46, 47 spaced between the reduced distal ends of the partitions $b, b'$. These areas 46, 47 are spaced outwardly from and disposed in substantial alinement with central partition $a$. The two plies 20, 21 are also interwoven to form relatively small areas 48, 49, 48′, 49′ which are located in the foot area 25 of the blanket and which may be in alinement with, but spaced outwardly from, corresponding ends of the partitions $h, l, h', l'$.

Generally, the blanket may be woven from warp and weft yarns, and the plies 20, 21 may be interwoven at the aforementioned partitions by passing either the warps or the weft yarns, or both, between the two plies 20, 21 as shown in FIGURE 2. While these are the most preferred methods of making the improved channel construction of the present invention, it is also contemplated that the channels and the enlarged pockets may be formed by sewing the two plies 20, 21 together along the lines forming the partitions. The two plies may be made from any suitable pliable web material in which they are interconnected to form the channels by interweaving, interknitting, sewing or any other means.

After the two-ply blanket is formed, substantially in the manner heretofore described, an electrical heating coil or coils are positioned in the desired channels R, S, S′, T, T′. In this instance, two parallel heating coils, respectively broadly designated at 50, 51 are connected to a relatively large thermostat assembly or thermostat package 52 positioned in pocket 41, and a resistance wire or electrical heating conductor 53 extends from the thermostat assembly 52 to a relatively small thermostat assembly 54 as compared to the assembly 52. Thermostat assembly 54 is positioned in a medial portion of the body of the special channel S.

A conductor 55 extends from the other end of thermostat assembly 54 to an enlarged thermostat assembly 56 positioned in pocket 40. A conductor 57 extends from the other end of thermostat assembly 56 to a suitable electrical connector 60 to which a mating connector, not shown, on an extension cord may be connected, as is usual.

In this instance, upon any of the thermostat assemblies 52, 54, 56 becoming overheated, due to overheating of corresponding portions of the blanket, it is apparent that this will break the circuit to both of the heating coils 50, 51. However, if so desired, the channel S' may be used in the same manner in which channel S is used so that the coils 50, 51 may be arranged in parallel circuits commencing at the electrical connector 60 rather than at the thermostat in assembly 52.

In FIGURE 4, an enlarged detail of channel T is illustrated, and since this channel is used in the same manner as the channels S, S' and T', and the remaining portions of the heating coils 50, 51 are entrained through the regular channels in a conventional manner, a further detailed description of the heating coils will be given only with respect to the channel T and its enlarged end portions or pockets 42, 43. It should be noted, however, that corresponding ends of the coils 50, 51 remote from the thermostat assembly 52 are also connected to the electrical connector 60, and portions of said corresponding ends of the coils 50, 51 extend transversely of corresponding ends of the partitions $a$ through $l$ and $b'$ through $l'$ and are retained in the latter position by the small ply interconnecting areas 48, 49 and 48', 49'.

Referring to FIGURES 3 and 4, the special channel T and its pockets 42, 43 have resistance wire or heating conductor sections 61 through 64 therein which are parts of heating coil 50. A central portion of the body of special channel T has a thermostat assembly 65, of conventional or other suitable construction, positioned therein. This thermostat assembly 65 may be of a type substantially as disclosed in U.S. Patent No. 2,727,116 granted to D. L. Alfred et al. on December 13, 1955, for example, and comprises a sealed plastic envelope or tube 66 within which a thermostatic switch 67 is positioned. Switch 67 has the conductor sections 62, 63 connected thereto, as best shown in FIGURE 4. Of course, the thermoplastic tube 66 is sealed where the conductor sections 62, 63 enter the same.

For purposes of comparison, the thermostat assembly 65 may be termed as being relatively small or non-flanged with respect to thermostat assemblies 70, 71 positioned in the pockets 42, 43 at opposite ends of the special channel T. The two thermostat assemblies or packages 70, 71 may be identical and, accordingly, only the thermostat assembly 70 will be described in detail and like reference characters shall apply to like elements associated with the thermostat assembly 71.

The thermostat assembly 70 is shown more in detail in FIGURE 8 wherein it comprises an elongate thermoplastic housing or body 72 in the form of a tube within which a pre-adjusted thermostatic switch 75 is positioned and which extends longitudinally of housing 72. Housing 72 has a flange or flange portions 73 projecting substantially radially from opposite sides thereof. Opposed portions of flange 73 may each be of a width of from one-half to equal the width or diameter of the tubular body 72. Thus, the width of the thermostat package may be of a width approximately equal to the length of the thermostatic switch 75, for example. The conductors 61, 62 enter opposite ends of housing 72 and may be connected to respective terminals 76, 77 on opposite ends of thermostatic switch 75, in substantially the manner disclosed in said U.S. Patent No. 2,727,116.

After the conductors 61, 62 have been connected to the terminals 76, 77 and the thermostatic switch 75 has been inserted in the housing 72, opposed end portions of the housing 72 are heat-sealed, as at 80, 81, so as to mold the thermoplastic material around the conductors 61, 62 and to prevent moisture from entering the housing and damaging the thermostatic switch 75.

Now, by referring to FIGURE 4, it will be noted that the flanges 73 enlarge the thermostat assemblies 70, 71 with respect to the relatively small thermostat assembly 65 so that, after the conductors 62, 63 have been connected to the thermostatic switches 75 in housings 72 of the two assemblies 70, 71, and after the assemblies 70, 71 have been inserted in the respective pockets 42, 43, the flanges 73 thereon will engage the shoulders formed at the junctures of the pockets 42, 43 with opposite ends of the body of special channel T. The small thermostat assembly 65 and the conductors 62, 63 should be of such combined length that the conductors 62, 63 will have very little if any slack therein when the blanket is laid out flat and the flanges 73 are in engagement with the shoulders of the pockets 42, 43.

Thus, it is apparent that the thermostat assemblies 70, 71 are restrained from movement longitudinally of the respective pockets 42, 43 and the relatively small thermostat assembly 65 is restrained from movement longitudinally of the special channel T. Even if the thermostat assemblies 65, 70, 71 should happen to be displaced relative to the blanket during laundering or by folding the blanket, or by severely wrinkling the same, it is apparent that these thermostat assemblies will automatically return to their original positions whenever the blanket is laid flat.

The form of the invention shown in FIGURES 5 and 9 is substantially the same as the forms shown in FIGURES 4 and 8 and shall, therefore, bear the same reference characters with the letter "$a$" added to avoid repetitive description. The form shown in FIGURES 5 and 9 differs from that shown in FIGURES 4 and 8 only in that one end portion of the tubular body 72$a$ is provided with a relatively narrow or short flange 73$a$ on each side thereof. It is apparent that the flanges 73$a$ on the thermostat assemblies 70$a$ serve the same purpose as the flanges 73 on the thermostat assemblies 70, 71 when installed in the blanket. Accordingly, a further detailed description of the second form of the invention is deemed unnecessary.

The third form of the invention shown in FIGURES 6 and 10 is also quite similar to the first form of the invention and, therefore, shall bear the same reference characters with the letter "$b$" added in order to avoid repetitive description. It will be noted that the third form of the invention differs from the first and second forms in that the tubular body or envelope 72$a$ does not have the flange 73$b$ integral therewith but, instead, the flange 73$b$ is a form of elongate washer disposed adjacent one end of, and adapted to be engaged by, the corresponding sealed body 72$b$ and being penetrated by the corresponding wire section. Thus, when the thermostat assemblies or packages 70$b$, 71$b$ and 65$b$ are installed in the manner shown in FIGURE 6, it is apparent that the flanges or washers 73$b$ retain the thermostat packages 70$b$, 71$b$, 65$b$ in the proper position within the blanket, in the same manner in which the thermostat packages 70, 71, 65 and 70$a$, 71$a$, 65$a$ of the first and second forms of the invention are retained in the respective blankets.

FIGURE 11 shows still another form of thermostat assembly or thermostat package 70$c$ which may be used in place of any one of the thermostat assemblies 70, 71, 70$a$, 70$b$, 71$b$ shown in FIGURES 4, 5, 6, 8, 9 and 10. The thermostat package 70$c$ is quite similar to the small thermostat packages shown in FIGURES 4, 5 and 6 but it is proportionately wider as compared to the length thereof than the relatively small intermediate packages 65, 65$a$, 65$b$ of FIGURES 4, 5 and 6. Accordingly, the thermostat package 70$c$ of FIGURE 10 need not be provided with any flanges thereon, and the various parts thereof shall bear the same reference characters as like parts associated with the thermostat package 70 with the small letter "$c$" added, in order to avoid repetitive description. The body 72$c$ is of relatively flat tubular form and may be of a width approximately equal to the length of the thermostatic switch 75$c$, for example.

According to the present method, after the blanket has been constructed in substantially the manner shown in FIGURE 1, those runs or sections of the heating coils 50, 51 which are devoid of thermostat assemblies are threaded through corresponding regular channels R in the body 24 of the blanket with a suitable guiding implement to which one end of the corresponding coil is connected, substantially as shown in FIGURE 3.

Now, assuming that the coil sections and corresponding thermostat packages are to then be inserted in special channel T and its pockets 42, 43, conductor sections 64, 63 are connected to the thermostatic switch 75 of thermostat assembly 71, the body 72 with its flanges 73 is positioned about the corresponding thermostat switch 75 and then opposed ends of the thermoplastic body or envelope 72 are heat-sealed in the manner heretofore described. Conductor sections 63, 62 are then connected to the thermostatic switch 67, the envelope 66 is slid over conductor section 62 so as to enclose thermostatic switch 67, and then opposed end portions of the thermoplastic body 66 are heat-sealed as shown in FIGURE 4.

Thereafter, conductor section 62, thermostatic switch assembly 65 and conductor section 63 are threaded through the special channel T until the flanges 73 of thermostat package 71 are pulled snugly against the shoulders at the juncture of the pocket 43 and the channel T. Thereafter, the blanket is wrinkled as shown in the right-hand portion of FIGURE 7 so as to reduce the effective length of the channel T and to thus expose the free end of conductor section 62.

Conductor sections 61, 62 are then connected to the thermostatic switch 75 of assembly 70 and the respective flanged thermoplastic housing 72 is then slid along conductor section 61 over thermostatic switch 75 and heat-sealed at 70, 81. Since the blanket has been wrinkled to shorten the effective length of the special channel T, it is apparent that the thermostatic switch assembly 70 is exposed as shown in FIGURE 7 during the heat-sealing of the housing 72 thereof.

After the thermostat assembly 70 has been connected to the conductor section 62 in the manner last described, it is then only necessary to straighten the blanket along the channel T so that the pocket 42 then encloses the thermostat assembly 70 as shown in the lower portion of FIGURE 4. Thereafter, it is a simple matter to thread the conductor section 61 between the small interwoven areas 48, 49 and corresponding ends of partitions l, h and to then connect the conductor section 61 to the electrical connector 60.

It should be noted that the thermostat assemblies 52, 54, 56 may be positioned in the special channel S and its pockets 41, 40; and that thermostat assemblies 65', 70', 71' may be positioned in the special channel T' and its respective pockets 44, 45 in substantially the same manner as that described with respect to the thermostat assemblies 65, 70, 71, to thus complete the installation of the heating coils and thermostats in the blanket. The thermostat assemblies 65', 70', 71' and respective conductor sections 61' through 64' correspond to thermostat assemblies 65, 70, 71 and conductors sections 61 through 64 and, therefore, a further description thereof is deemed unnecessary.

It is preferred that the body of each special channel S, S', T, T' is of the same width throughout its length between the respective pockets and shoulders formed thereby, so that any relatively small thermostat assemblies, such as 54, 65, 65', may fit relatively snugly within the respective channel bodies. However, it is contemplated that medial portions of the bodies of the special channels may be enlarged, if desired, so that the shoulders formed by the pockets may be in the form of relatively short restricted portions at each end of the body of each special channel.

As is well known, before the heating coils are installed in the blanket, the outer surfaces of either or both plies 20, 21 formed of fabric may be napped, and after the heating coils 50, 51 have been installed, the blanket may be finished by enclosing both the top and bottom edges in an attractive binding fabric, portions of which are indicated at 85, 86 in FIGURE 3, this fabric 85, 86 extending over and around the end edges of both plies 20, 21 and being secured by stitches extending through both plies and through the bindings, as is usual. Also, if so desired, a stitched hem 87 may be formed along each side edge of the blanket with the stitching extending through both plies of fabric 20, 21.

It is thus seen that we have provided a novel electrically heated blanket construction and method wherein the blanket is provided with a plurality of elongate substantially parallel channels through which conductor sections of a heating coil or coils are extended, and wherein certain of the channels include enlarged pockets in which relatively large or flanged thermostat assemblies may be positioned with a conductor section extending therebetween when the blanket is in a flat state so as to prevent displacement of the thermostat assemblies. It is seen further that a relatively small thermostat assembly or package may be interposed in the medial portion of the conductor means interconnecting the two relatively large thermostat packages positioned in said pockets and that the enlarged thermostat packages will also prevent displacement of the relatively small thermostat package in the corresponding channel. Even though the various thermostat assemblies may accidentally become slightly displaced in the respective channels and pockets during rough handling of the blanket, such as in laundering, the displacement of the thermostat assemblies is limited and the switch assemblies will return to their proper positions whenever the blanket is again laid flat.

In the drawings and specification there have been set forth preferred embodiments of the invention and, although specific terms are employed, they are used in a generic and descriptive sense only and not for purposes of limitation, the scope of the invention being defined in the claims.

We claim:

1. An electrically heated blanket comprising a two-ply blanket fabric, the two plies of the fabric being interconnected at spaced intervals to provide a series of parallel tubular channels between the plies, a heating coil of resistance wire in said channels, at least one of said channels being enlarged adjacent each end thereof to form enlarged pockets thereat with a channel body therebetween, the length of said channel body being at least equal to one-fourth the length of the blanket when viewed longitudinally of the channel body, a thermostat assembly positioned within each pocket and being interposed in said coil, each thermostat assembly being of greater width than the respective channel body, at least one thermostat assembly of lesser width than each first-named thermostat assembly, and said additional thermostat assembly being located in a medial portion of said respective channel and interposed in said coil.

2. A blanket including two plies of pliable web material, means interconnecting said two plies at spaced intervals to provide a series of substantially parallel channels between said plies, at least one of said channels being enlarged adjacent each end thereof, a relatively small thermostat package positioned in a medial portion of said one of said channels, electrical conductors extending from said small package, and relatively large thermostat packages positioned in the enlarged portions of said one of the channels and connected to the distal ends of the conductors extending from the first-mentioned thermostat package, there being shoulders at the junctures of the pockets and said one of the channels whereby the thermostat packages are retained in predetermined position relative to the blanket.

3. An electrically heated article comprising two plies of pliable web material, a plurality of elongate substantially parallel and spaced partitions interconnecting said plies and forming channels therebetween, at least one adjacent pair of said partitions forming shoulders at opposite ends thereof which are spaced inwardly from corresponding end edges of said plies, the distance between the shoulders of each of the partitions of said pair being equal at least to one-fourth of the length of said plies between said end edges, electrical conductor means extending longitudinally within at least that channel defined between said pair of partitions, thermostat assemblies of greater width than the width of said last-named channel and being attached to opposite ends of said conductor means, and said thermostat assemblies being adapted to engage the respective shoulders whereby said thermostat assemblies are retained in position between said plies, and at least one additional thermostat assembly of lesser width than said first-named thermostat assemblies and being interposed in said conductor means within said last-named channel.

4. An electrically heated blanket comprising two plies of pliable web material having opposed end edges, a plurality of elongate substantially parallel and spaced partitions interconnecting said plies and forming channels therebetween, at least one adjacent pair of said partitions forming first and second pairs of shoulders at opposite ends thereof which are spaced inwardly from the corresponding end edges of said plies, electrical conductor means extending longitudinally within certain of said channels, first and second thermostat assemblies of greater width than the distance between each of said pair of shoulders and being attached to said conductor means, said first and second thermostat assemblies being engageable with distal ends of the respective first and second pairs of shoulders for retaining said thermostat assemblies in position between said plies, and the distance between the distal ends of said first and second shoulders being at least equal to one-fourth the length of said blanket, and at least one additional thermostat assembly of lesser width than said first-named thermostat assembly and being interposed in said conductor means within that channel defined between said pair of partitions.

5. A blanket including two plies of fabric, means interconnecting said two plies at spaced intervals to provide a series of substantially parallel conductor-receiving channels between said plies, at least one of said channels being larger adjacent each end than the medial portion thereof, a first thermostat package positioned in the medial portion of said one of said channels and having electrical conductors extending therefrom, second thermostat packages positioned in the enlarged end portions of said one of the channels and connected to the distal ends of the conductors extending from said first thermostat package, and the second thermostat packages each being of a greater width than the medial portion of said one channel, whereby the second packages are prevented from entering the medial portion of said one channel so that all of the thermostat packages are retained in predetermined position relative to the blanket.

References Cited in the file of this patent

UNITED STATES PATENTS

| | | |
|---|---|---|
| 1,618,322 | Bettenhausen | Feb. 22, 1927 |
| 2,203,918 | Moberg | June 11, 1940 |
| 2,393,182 | Newell | Jan. 15, 1946 |
| 2,421,953 | MacKendrick | June 10, 1947 |
| 2,432,785 | Moberg | Dec. 16, 1947 |
| 2,508,101 | Crowley | May 16, 1950 |
| 2,727,116 | Alfred et al. | Dec. 13, 1955 |
| 2,961,526 | Dykes | Nov. 22, 1960 |
| 3,028,477 | Russell | Apr. 3, 1962 |

FOREIGN PATENTS

| | | |
|---|---|---|
| 605,666 | Great Britain | July 28, 1948 |